United States Patent
Holly et al.

(10) Patent No.: US 8,193,966 B2
(45) Date of Patent: Jun. 5, 2012

(54) WIRE DETECTION SYSTEMS AND METHODS

(75) Inventors: Sandor Holly, Woodland Hills, CA (US); Donald E. Harrington, Moorpark, CA (US); Nicholas Koumvakalis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 12/579,461

(22) Filed: Oct. 15, 2009

(65) Prior Publication Data

US 2011/0090119 A1 Apr. 21, 2011

(51) Int. Cl.
*G01S 13/89* (2006.01)

(52) U.S. Cl. ............... 342/22; 342/27; 342/29; 342/179

(58) Field of Classification Search ............... 342/22, 342/27, 29, 179, 191
See application file for complete search history.

(56) References Cited

U.S. PATENT DOCUMENTS

| | | | |
|---|---|---|---|
| 3,775,765 A | 11/1973 | Di Piazza et al. | |
| 4,555,179 A * | 11/1985 | Langerholc et al. | 356/342 |
| 6,285,288 B1 * | 9/2001 | Langdon et al. | 340/603 |
| 6,377,872 B1 | 4/2002 | Struckman | |
| 6,650,407 B2 * | 11/2003 | Jamieson et al. | 356/141.1 |
| 6,665,063 B2 * | 12/2003 | Jamieson et al. | 356/141.1 |
| 6,853,327 B2 * | 2/2005 | Miceli et al. | 342/22 |
| 6,864,825 B2 | 3/2005 | Holly | |
| 6,943,742 B2 | 9/2005 | Holly | |
| 6,950,076 B2 | 9/2005 | Holly | |
| 6,999,041 B2 | 2/2006 | Holly | |
| 7,009,575 B2 | 3/2006 | Holly | |
| 7,142,147 B2 | 11/2006 | Holly | |
| 7,486,250 B2 | 2/2009 | Vetrovec et al. | |
| 7,668,374 B2 * | 2/2010 | Harder et al. | 382/181 |
| 7,839,322 B2 * | 11/2010 | Filias et al. | 342/33 |
| 7,969,578 B2 * | 6/2011 | Yun et al. | 356/497 |
| 2004/0178943 A1 | 9/2004 | Niv | |
| 2008/0231525 A1 | 9/2008 | Krapf et al. | |
| 2011/0090119 A1 * | 4/2011 | Holly et al. | 342/368 |

FOREIGN PATENT DOCUMENTS

| | | |
|---|---|---|
| JP | 5206638 A | 11/1975 |
| WO | 9901781 A1 | 1/1999 |
| WO | 9946831 A1 | 9/1999 |

OTHER PUBLICATIONS

GB Search Report mailed Feb. 8, 2011.
Skolnick, M., Introduction to Radar Systems, 2d Editon, p. 436.

* cited by examiner

*Primary Examiner* — John B Sotomayor
(74) *Attorney, Agent, or Firm* — Caven & Aghevli LLC (57) ABSTRACT

In one embodiment a system to detect, from a remote location, one or more wires in a target location comprises a radiation targeting assembly to direct a rotating polarization radiation field at the target location, a reflected radiation collecting assembly that collects radiation reflected from the target location, and a signal processing module to monitor radiation from the rotating radiation field reflected from the target location and generate a signal when the radiation reflected from the target location indicates the presence of a wire in the target location. Other embodiments may be described.

30 Claims, 5 Drawing Sheets

WIRE DETECTION SYSTEMS AND METHODS

FIELD OF THE DISCLOSURE

This invention relates to wire detection systems and methods and more particularly to systems and methods which can detect one or more wires from a remote location.

BACKGROUND

The ability to detect wires from a remote location may find utility in a variety of applications. For example, in certain aviation applications the ability to detect wires from a remote location may be useful to avoid airborne collisions with the wires. Further, in military applications the ability to detect wires from a remote location may be useful to avoid hazard such as improvised explosive devices such as bombs which are buried proximate a road.

SUMMARY

In various aspects, wire detection systems and methods are provided. In some embodiments, wire detection systems and methods as described herein direct a rotating radiation field at a target location, which may be on the ground or in the air and generate an intensity mapping from radiation reflected from the target location. At points in time when the polarization of the radiation field is substantially parallel to the wire, the wire will backscatter, or reflect, the radiation relatively efficiently. By contrast, when the polarization of the radiation is perpendicular to the wire, the wire will not reflect radiation efficiently. Thus, a wire disposed within a target location will generate a reflection pattern that appears then fades as the polarization of the radiation is rotates between a polarization parallel to the wire and a polarization perpendicular to the wire. When such a pattern is detected a signal may be generated, which in turn may be presented on a suitable user interface, e.g., a display or by an audible source such as a speaker. Users of the system may then take appropriate action.

Thus, in one aspect there is provided a method to detect, from a remote location, one or more wires in a target location. In one embodiment the method comprises directing a rotating radiation field at the target location, monitoring radiation from the rotating radiation field reflected from the target location, and generating a signal when the radiation reflected from the target location indicates the presence of a wire in the target location.

In another aspect there is provided a system to detect, from a remote location, one or more wires in a target location. In one embodiment, the system comprises a radiation targeting assembly to target a rotating radiation field at the target location, a reflected radiation collecting assembly that collects radiation reflected from the target location, and a signal processing module to monitor radiation from the rotating radiation field reflected from the target location and generate a signal when the radiation reflected from the target location indicates the presence of a wire in the target location.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

Described herein are exemplary wire detection systems and methods. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
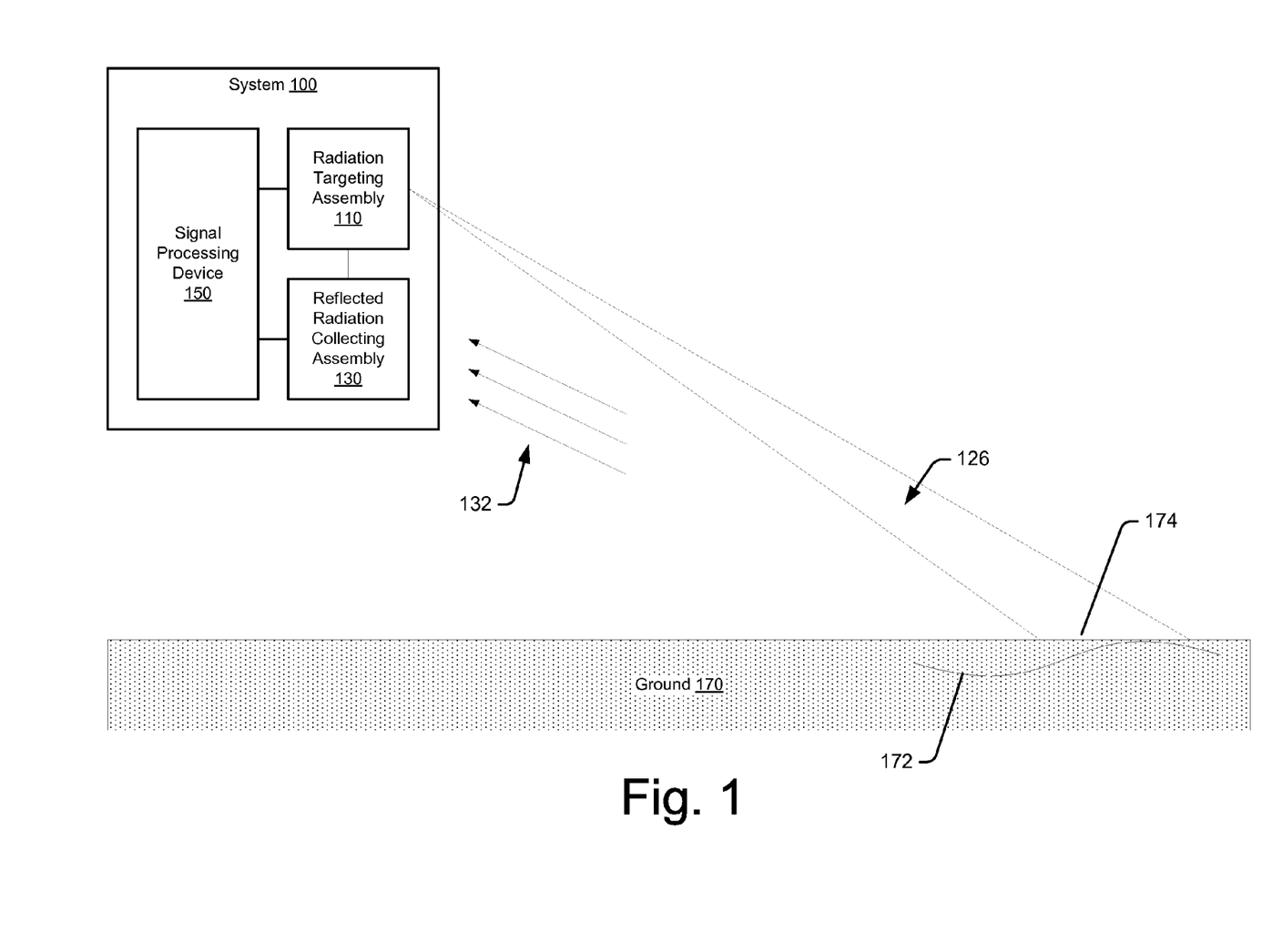
FIG. 1 is a schematic illustration of a wire detection system in accordance with some embodiments.

FIG. 1 is a schematic illustration of a wire detection 100 system in accordance with some embodiments. Referring to FIG. 1, in one embodiment a wire detection system 100 comprises a radiation targeting assembly 110 communicatively coupled to a reflected radiation collecting assembly 130, both of which are communicatively coupled to a signal processing device 150. The particular form of the communication link between the radiation targeting assembly 110, the reflected radiation collecting assembly 130, and the signal processing module 150 is not critical. In some embodiments, these devices may be communicatively coupled by a communication bus, a fiber optical cable, a wireless communication link, or another suitable connection.

By way of overview, in the embodiment depicted in FIG. 1, the radiation targeting assembly 110 directs a radiation field 126 with rotating polarization at a target location 174, on the ground 170. The reflected radiation collecting assembly 130 collects radiation from the ambient environment, including radiation 132 reflected, or backscattered, from the target location 174, and generates signals from the collected radiation. The signals are input to a signal processing device 150, which generates an intensity mapping characteristic of the radiation 132 reflected from the target location 174. At points in time when the polarization of the radiation field 126 is substantially parallel to the wire 172, the wire 172 will backscatter, or reflect, the radiation relatively efficiently. By contrast, when the polarization of the radiation 126 is perpendicular to the wire, the wire will not reflect radiation efficiently. Thus, a wire 172 disposed within the target location 174 will result in a reflection pattern that appears then fades as the polarization of the radiation field 126 rotates between a polarization parallel to the wire and a polarization perpendicular to the wire 172. When such a pattern is detected a signal may be generated, which in turn may be presented on a suitable user interface, e.g., a display or by an audible source such as a speaker.

Figure 2:
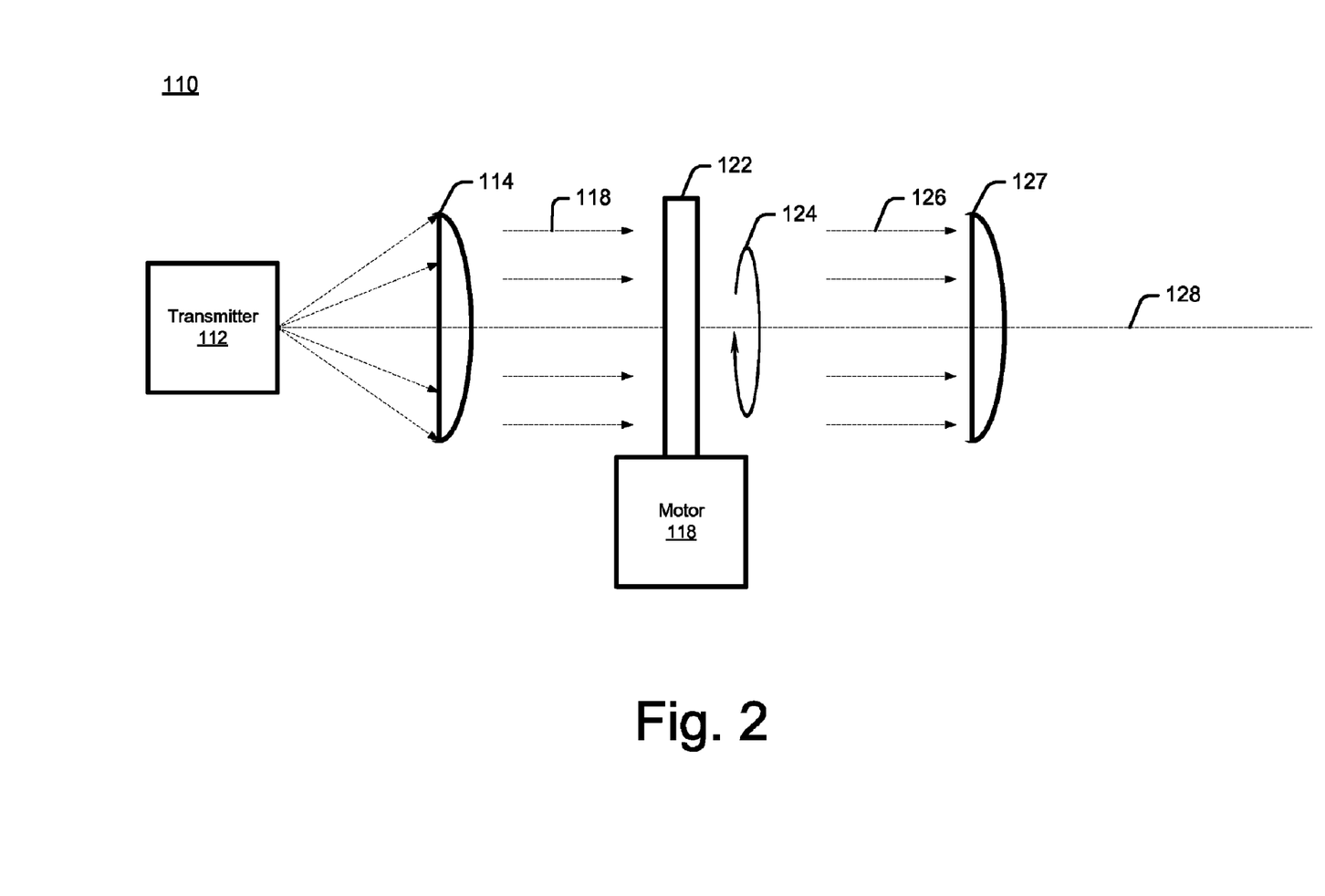
FIG. 2 is a schematic illustration of a radiation targeting assembly in a wire detection system, according to embodiments.

Additional details of the system 100 and its operation are described with reference to FIGS. 2-5. FIG. 2 is a schematic illustration of a radiation targeting assembly 110 in a wire detection system, according to embodiments. In the embodiment depicted in FIG. 2, a radiation targeting assembly 110 comprises a transmitter 112, a collimating lens 114, and a half-wave plate 122 which may be rotated about an axis 128 as indicated by arrow 124 by a motor 118.

Figure 5:
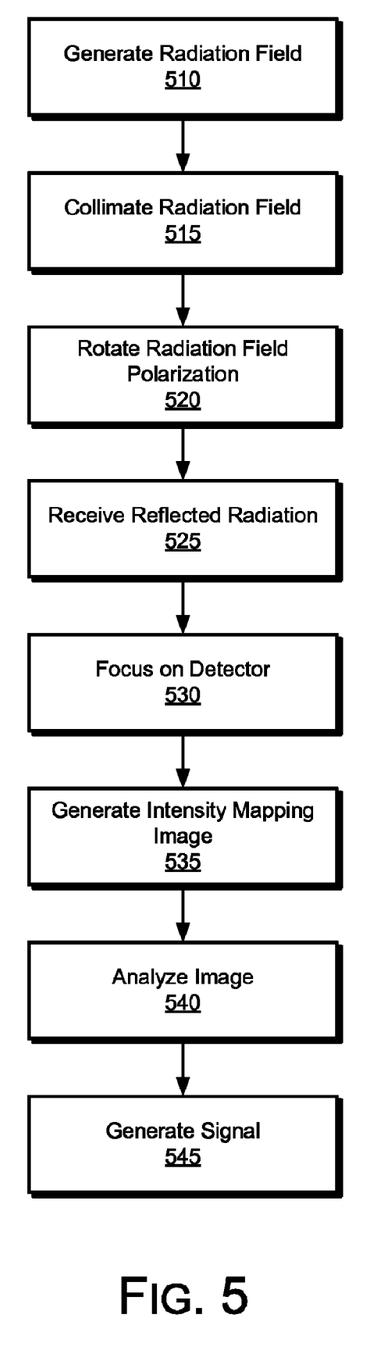
FIG. 5 is a flowchart illustrating operations in a method of wire detection, according to embodiments.

Transmitter 112 may be implemented as a radiation source (e.g., a diode, a magnetron, or the like) which generates (operation 510) electromagnetic radiation. The particular wavelength of the radiation is not critical. In general, the wavelength of the radiation should be approximately of the same order of magnitude as the thickness of the wire to be detected. In addition, the wavelength of the radiation should be within a range that remains collimated over the distance from the radiation targeting assembly 110 to the target location. This distance will necessarily differ in different applications. For example, in an embodiment in which the target location is at a distance between 25 meters and 250 meters radiation having a wavelength in the range of 0.5 millimeters to 10 millimeters, and preferably in the range of 3 millimeters to 4 millimeters may be appropriate.

Radiation emitted from the transmitter 112 is directed through a collimating lens 114, which produces a collimated radiation beam (operation 515) as indicated by arrows 118. The collimated radiation beam 118 is directed through a half-wave plate 122, which is rotated about an axis 128 by motor 118, as indicated by arrow 124. Motor 118 may be implemented as a suitable motor, e.g., a servo motor or the like. In some embodiments, the collimated radiation 126 may be directed through an optional focusing lens 127.

In operation, the half-wave plate 122 rotates (operation 520) the polarization of the field between a first orientation and a second orientation, which are orthogonal to one another. The rotation of the half-wave plate causes the polarization of the radiation to change at twice the rate of rotation, i.e., the polarization of the radiation rotates 90 degrees for every 45 degree rotation of the half-wave plate 122. Thus, a rotating, collimated beam of polarized radiation 126 emerges from the half-wave plate 122.

One skilled in the art will recognize that the various components of the radiation targeting assembly 110 may be enclosed in a suitable structure or housing. Further, one skilled in the art will recognize that there are alternate methods to produce a rotating, collimated beam of orthogonally polarized radiation 126. By way of example, and not limitation, the collimating lens 112 may comprise a polarizer, e.g., a thin film, a diffraction grating or the like, which may be rotated about an axis. Alternately, one or more beam splitter polarizers could be used. In other embodiments, the radiation source 112 may produce a polarized radiation beam, and the radiation source 112 may be rotated about an axis. In other embodiments the radiation source 112 may generate a first radiation beam which is sine amplitude modulated and a second radiation beam which is cosine amplitude modulated, and the two orthogonal beams may be combined and passed through a collimating lens 112. The salient feature is to obtain a rotating, collimated beam of polarized radiation 126 emerging from the radiation targeting assembly 110.

The rotating, collimated radiation beam is directed toward the target area 174 depicted in FIG. 1. As indicated in FIG. 1, radiation will be reflected from the wire 172 when the polarization of the incident beam is parallel to the wire (i.e., E-field horizontal), while radiation will not be reflected from the wire when the polarization of the incident beam is perpendicular to the wire. Thus, as the polarization of the incident beam rotates, the wire will alternate in time between reflecting radiation and not reflecting radiation.

Figure 3:
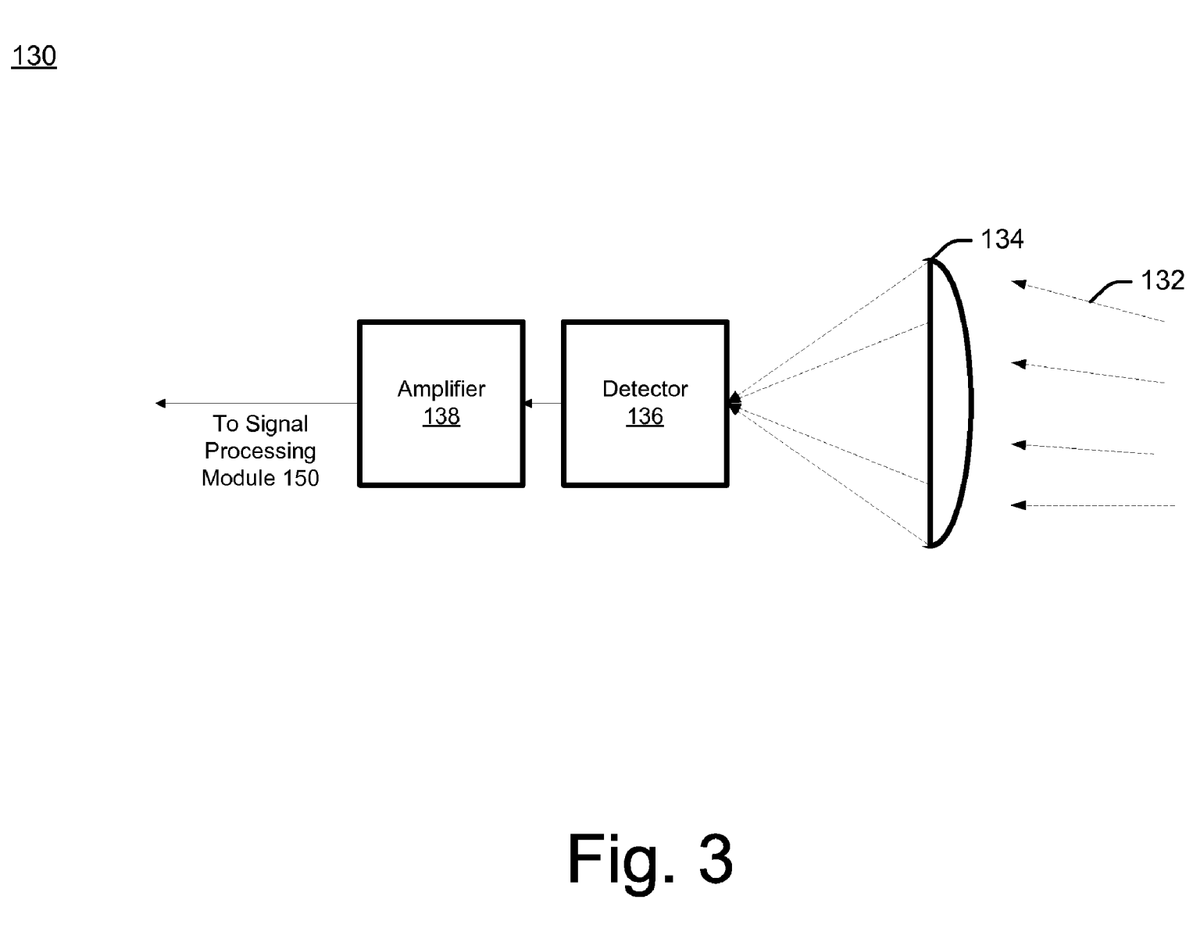
FIG. 3 is a schematic illustration of a reflected radiation collecting assembly in a wire detection system, according to embodiments.

The reflected radiation collecting assembly 130 receives (operation 525) radiation from the ambient environment, including radiation reflected from the target location 172. FIG. 3 is a schematic illustration of a reflected radiation collecting assembly 130 in a wire detection system, according to embodiments. Referring to FIG. 3, reflected radiation collecting assembly 130 receives reflected radiation 132, which is amplitude modulated. A focusing lens 134 focuses (operation 530) radiation from the target zone onto a detector 136. In some embodiments, detector 136 may be implemented as a charge coupled device (CCD), which generates a plurality of output signals corresponding to the intensity of the radiation incident on a cell of the CCD. The output signals may be amplified by an amplifier 138 and directed to the signal processing device 150. In other embodiments, detector 136 may simply be a single diode detector which generates an output signal proportional to the received radiation.

In some embodiments the signal processing device may be implemented as logic instructions which execute on a general purpose processing device, e.g., a computing system. In alternate embodiments the signal processing device 150 may be implemented as in a programmable logic device (e.g., a field programmable gate array) or may be reduced to hardwired circuitry in a dedicated logic device (e.g., an application specific integrated circuit).

Figure 4:
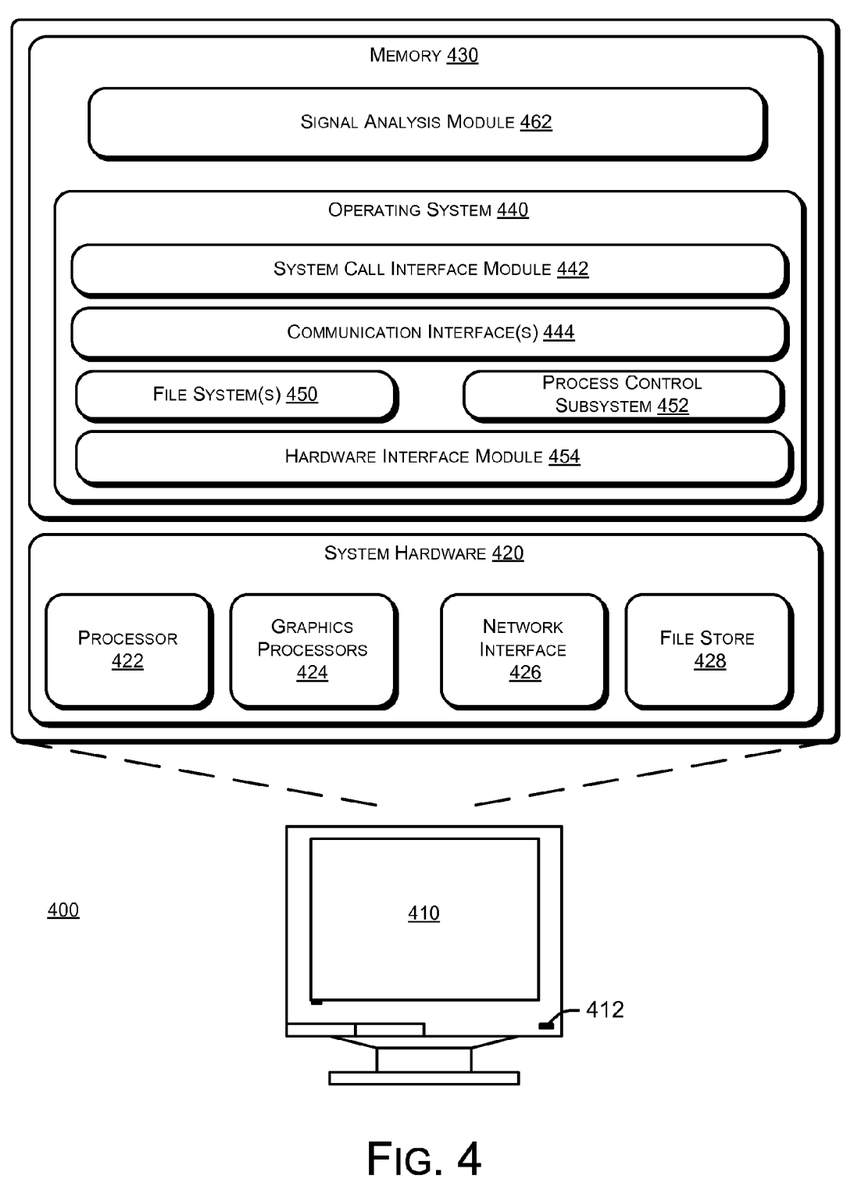
FIG. 4 is a schematic illustration of a computing system in which portions of a system for wire detection may be implemented according to embodiments.

FIG. 4 is a schematic illustration of a computing system in which portions of a system for wire detection may be implemented according to embodiments. In some embodiments, a signal analysis module 462 may be implemented as logic instructions which execute on a general purpose processor, e.g., a computing device. In one embodiment, system 400 includes system hardware 420 and memory 430, which may be implemented as random access memory and/or read-only memory.

System hardware 420 may include one or more processors 422, a graphics processor 424, network interfaces 426, and a file store 428. As used herein, the term "processor" should be construed to include any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor 424 may function as an adjunct processor that manages graphics and/or video operations. Graphics processors 424 may be integrated onto a motherboard of the processing device 400 or may be coupled via an expansion slot on a motherboard.

In one embodiment, network interface 426 could be a wired interface such as an Ethernet interface or a wireless interface such as an IEEE 802.11a, b or g-compliant interface. Another example of a wireless interface would be a general packet radio service (GPRS) interface.

A file store 428 which may be implemented as, e.g., non-volatile memory, one or more hard drives, CD-ROM drives, DVD-ROM drives, or other types of storage devices. File store 428 may also be external to system 400 such as, e.g., one or more external hard drives, network attached storage, or a separate storage network.

System 400 may include, or be coupled to, a display device 410. In some embodiments, display device 410 may comprise a liquid crystal display (LCD) device, a cathode ray tube (CRT) device, or the like. Display 410 may comprise, or be coupled to, one or more auditory interfaces, e.g., a speaker 412.

Memory 430 may include an operating system 440 for managing operations of system 400. In one embodiment, operating system 440 includes a hardware interface module 454 that provides an interface to system hardware 220. In addition, operating system 440 may include a file system 450 that manages files used in the operation of system 400 and a process control subsystem 452 that manages processes executing on system 400.

Operating system 440 may include (or manage) one or more communication interfaces 444 that may operate in conjunction with system hardware 420 to receive data packets and/or data streams from a remote source. Operating system 440 may further include a system call interface module 442 that provides an interface between the operating system 440 and one or more application modules resident in memory 430. Operating system 440 may be embodied as a UNIX operating system or any derivative thereof (e.g., Linux, Solaris, etc.) or as a Windows® brand operating system, or other operating systems.

In one embodiment, memory 430 includes a signal analysis module 462 to evaluate at least one signal characteristic of a signal transmitted from the reflected radiation collecting assembly 110. In one embodiment, a signal analysis module 462 may include logic instructions encoded in a computer-readable storage medium which, when executed by processor 422, cause the processor 422 to analyze one or more signal characteristics to determine whether the reflected signal has signal characteristics which indicate that a wire is present within the target zone 174.

In one embodiment the signal processing module 462 generates (operation 535) an image which represents an intensity mapping of the rotating radiation field reflected from the target location 174. The image may be presented on a display device, such as display 410. Alternately, the image may be stored in a computer readable medium, e.g., as an array of values representative of the CCD signals generated by the detector 136. The image may then be analyzed (operation 540) for a pattern which might indicate the presence of a wire. By way of example, in one embodiment the signal processing module may compute an average intensity reading of the values in a given array. The average intensity reading may be representative of the background noise radiation level received by the reflected radiation collecting assembly 130. The signal processing module 462 may then scan the array may for values which exceed the average intensity reading by a threshold amount. If the intensity reading associated with a sufficient number of data points in the array exceeds a threshold, then the signal processing module 462 may generate a signal (operation 545) which indicates that a wire is present.

Thus, as described herein a wire detection system directs a rotating field of electromagnetic radiation toward a target location and uses radiation reflected from the target location to determine whether a wire may be present in the target location.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to detect, from a remote location, one or more wires in a target location, comprising:
   directing a rotating polarization radiation field at the target location;
   monitoring radiation from the rotating radiation field reflected from the target location; and
   generating a signal when the radiation reflected from the target location indicates the presence of a wire in the target location,
   wherein directing a rotating radiation field at the target location comprises:
      generating a radiation beam from a radiation source;
      passing the radiation beam through a collimating lens to generate a collimated radiation beam; and
      passing the radiation beam through a rotating half-wave plate to generate a rotating polarization radiation field.

2. The method of claim 1, wherein the radiation has a wavelength in the range of 0.5 millimeters to 10 millimeters.

3. The method of claim 1, further comprising directing the collimated radiation beam through at least one focusing lens.

4. The method of claim 1, wherein monitoring radiation from the rotating polarization radiation field reflected from the target location comprises:
   collecting a portion of the radiation from the rotating radiation field reflected from the target location; and
   focusing the radiation onto a detector.

5. The method of claim 4 further comprising:
   generating an image which represents an intensity mapping of the rotating radiation field reflected from the target location; and
   monitoring the image for an intensity pattern which represents a wire.

6. A method to detect, from a remote location, one or more wires in a target location, comprising:
   directing a rotating polarization radiation field at the target location;
   monitoring radiation from the rotating radiation field reflected from the target location; and
   generating a signal when the radiation reflected from the target location indicates the presence of a wire in the target location,
   wherein directing a rotating polarization radiation field at the target location comprises:
      rotating a radiation source about an axis;
      generating a radiation beam from the radiation source; and
      passing the radiation beam through a collimating lens to generate a collimated radiation beam.

7. The method of claim 6, further comprising directing the collimated radiation beam through at least one focusing lens.

8. The method of claim 6, wherein the radiation has a wavelength in the range of 0.5 millimeters to 10 millimeters.

9. The method of claim 6, wherein monitoring radiation from the rotating polarization radiation field reflected from the target location comprises:
   collecting a portion of the radiation from the rotating radiation field reflected from the target location; and
   focusing the radiation onto a detector.

10. The method of claim 9, further comprising:
   generating an image which represents an intensity mapping of the rotating radiation field reflected from the target location; and
   monitoring the image for an intensity pattern which represents a wire.

11. A method to detect, from a remote location, one or more wires in a target location, comprising:
   directing a rotating polarization radiation field at the target location;
   monitoring radiation from the rotating radiation field reflected from the target location; and generating a signal when the radiation reflected from the target location indicates the presence of a wire in the target location,
wherein directing a rotating polarization radiation field at the target location comprises:
generating a first radiation beam which is sine amplitude modulated;
generating a second radiation beam which is cosine amplitude modulate;
combining the first radiation beam and the second radiation beam; and
passing the combined first radiation beam and second radiation beam through a collimating lens to generate a collimated radiation beam.

12. The method of claim 11, further comprising directing the collimated radiation beam through at least one focusing lens.

13. The method of claim 11, wherein the radiation has a wavelength in the range of 0.5 millimeters to 10 millimeters.

14. The method of claim 11, wherein monitoring radiation from the rotating polarization radiation field reflected from the target location comprises:
collecting a portion of the radiation from the rotating radiation field reflected from the target location; and
focusing the radiation onto a detector.

15. The method of claim 14, further comprising:
generating an image which represents an intensity mapping of the rotating radiation field reflected from the target location; and
monitoring the image for an intensity pattern which represents a wire.

16. A system to detect, from a remote location, one or more wires in a target location, comprising:
a radiation targeting assembly to direct a rotating polarization radiation field at the target location;
a reflected radiation collecting assembly that collects radiation reflected from the target location;
a signal processing module to monitor radiation from the rotating polarization radiation field reflected from the target location and generate a signal when the radiation reflected from the target location indicates the presence of a wire in the target location,
wherein the radiation targeting assembly:
generates a radiation beam from a radiation source;
passes the radiation beam through a collimating lens to generate a collimated radiation beam; and
passes the radiation beam through a rotating half-wave plate to generate a rotating polarization radiation field.

17. The system of claim 16, wherein the radiation has a wavelength in the range of 0.5 millimeters to 10 millimeters.

18. The system of claim 16, wherein the reflected radiation collecting assembly directs the collimated radiation beam through at least one focusing lens.

19. The system of claim 16, wherein the reflected radiation collecting assembly:
collects a portion of the radiation from the rotating radiation field reflected from the target location; and
focuses the radiation onto a detector.

20. The system of claim 19, wherein the signal processing module:
generates an image which represents an intensity mapping of the rotating radiation field reflected from the target location; and
monitors the image for an intensity pattern which represents a wire.

21. A system to detect, from a remote location, one or more wires in a target location, comprising:
a radiation targeting assembly to direct a rotating polarization radiation field at the target location;
a reflected radiation collecting assembly that collects radiation reflected from the target location;
a signal processing module to monitor radiation from the rotating polarization radiation field reflected from the target location and generate a signal when the radiation reflected from the target location indicates the presence of a wire in the target location,
wherein the radiation targeting assembly:
rotates a radiation source about an axis;
generates a radiation beam from the radiation source; and
passes the radiation beam through a collimating lens to generate a collimated radiation beam.

22. The system of claim 21, wherein the reflected radiation collecting assembly directs the collimated radiation beam through at least one focusing lens.

23. The system of claim 21, wherein the radiation has a wavelength in the range of 0.5 millimeters to 10 millimeters.

24. The system of claim 21, wherein the reflected radiation collecting assembly:
collects a portion of the radiation from the rotating radiation field reflected from the target location; and
focuses the radiation onto a detector.

25. The system of claim 24, wherein the signal processing module:
generates an image which represents an intensity mapping of the rotating radiation field reflected from the target location; and
monitors the image for an intensity pattern which represents a wire.

26. A system to detect, from a remote location, one or more wires in a target location, comprising:
a radiation targeting assembly to direct a rotating polarization radiation field at the target location;
a reflected radiation collecting assembly that collects radiation reflected from the target location;
a signal processing module to monitor radiation from the rotating polarization radiation field reflected from the target location and generate a signal when the radiation reflected from the target location indicates the presence of a wire in the target location,
wherein the radiation targeting assembly:
generates a first radiation beam which is sine amplitude modulated;
generates a second radiation beam which is cosine amplitude modulate;
combines the first radiation beam and the second radiation beam; and
passes the combined first radiation beam and second radiation beam through a collimating lens to generate a collimated radiation beam.

27. The system of claim 26, further comprising at least one focusing lens for directing the collimated beam.

28. The system of claim 26, wherein the radiation has a wavelength in the range of 0.5 millimeters to 10 millimeters.

29. The system of claim 26, wherein the reflected radiation collecting assembly:
collects a portion of the radiation from the rotating radiation field reflected from the target location; and
focuses the radiation onto a detector.

30. The system of claim 29, wherein the signal processing module:
  generates an image which represents an intensity mapping of the rotating radiation field reflected from the target location; and
  monitors the image for an intensity pattern which represents a wire.

* * * * *